US012650559B2

(12) United States Patent
Campanella et al.

(10) Patent No.: US 12,650,559 B2
(45) Date of Patent: Jun. 9, 2026

(54) PLANAR PHOTONIC RESONANT MOTOR

(71) Applicant: QOPSYS S.R.L., Avezzano (IT)

(72) Inventors: Carlo Edoardo Campanella, Gioia del Colle (IT); Giovanni De Amicis, L'Aquila (IT); Alfonso D'Anna, Avezzano (IT)

(73) Assignee: QOPSYS S.R.L., Avezzano (IT)

( * ) Notice: Subject to any disclaimer, the term of this patent is extended or adjusted under 35 U.S.C. 154(b) by 207 days.

(21) Appl. No.: 18/283,648

(22) PCT Filed: Mar. 23, 2022

(86) PCT No.: PCT/IB2022/052641
§ 371 (c)(1),
(2) Date: Sep. 22, 2023

(87) PCT Pub. No.: WO2022/201050
PCT Pub. Date: Sep. 29, 2022

(65) Prior Publication Data
US 2024/0184050 A1      Jun. 6, 2024

(30) Foreign Application Priority Data

Mar. 24, 2021      (IT) ......................... 102021000007118

(51) Int. Cl.
*G02B 6/293*          (2006.01)
(52) U.S. Cl.
CPC ................................ *G02B 6/29338* (2013.01)
(58) Field of Classification Search
CPC ............................................... G02B 6/29338
(Continued)

(56) References Cited

U.S. PATENT DOCUMENTS

| 2009/0116788 A1 | 5/2009 | Rakich et al. |
| 2017/0192221 A1 | 7/2017 | Manipatruni et al. |
| 2019/0285797 A1* | 9/2019 | Campanella ....... G02B 6/12004 |

FOREIGN PATENT DOCUMENTS

WO          2018087789 A1      5/2018

OTHER PUBLICATIONS

International Search Report, issued in PCT/IB2022/052641, mailed Aug. 3, 2022, Rijswijk, NL.

(Continued)

*Primary Examiner* — Jerry M Blevins
(74) *Attorney, Agent, or Firm* — ArentFox Schiff LLP; Michael Fainberg

(57)          ABSTRACT

A photonic motor has at least one optical radiation input, a first optical waveguide arrangement having at least one first optical resonator lying in a first region of space of a common plane, an excitation optical waveguide arrangement, and a second optical waveguide arrangement having at least one second optical resonator lying in a second region of space of the common plane and configured to move in the second region of space. The first and second optical resonators drive a fundamental symmetric resonant mode and a fundamental anti-symmetric resonant mode. When the fundamental symmetric mode is established, an attractive condition generates a motion of approach of the second optical resonator towards the first optical resonator. When the fundamental anti-symmetric resonant mode is established, a repulsion condition generates a motion of departure of the second optical resonator from the first optical resonator.

24 Claims, 9 Drawing Sheets

(58) Field of Classification Search
USPC ........................................................... 385/30
See application file for complete search history.

(56) References Cited

OTHER PUBLICATIONS

Varat Intaraprasonk, Shanhui Fan, Optical pulling force and conveyor belt effect in resonator-waveguide system, Optics Letters, Sep. 1, 2013, pp. 3264-3267, vol. 38, Issue 17, Optical Society of America, US.
Rakich Peter T. et al., Trapping, corralling and spectral bonding of optical resonances through optically induced potentials, Nature Photonics, pubslihed online Nov. 1, 2007, pp. 658-665, vol. 1 Issue 11, Nature Publishing Group.
Povinelli M. L., High-Q enhancement of attractive and repulsive optical forces between coupled whispering-gallery-mode resonators, Optics Express, Oct. 3, 2005, pp. 8286-8295, vol. 13, Issue 20, Optical Society of America, US.

* cited by examiner a)

b)

PLANAR PHOTONIC RESONANT MOTOR

CROSS-REFERENCE TO RELATED APPLICATIONS

This application is a National Phase Application of PCT International Application No. PCT/IB2022/052641, having an International Filing Date of Mar. 23, 2022 which claims priority to Italian Application No. 102021000007118 filed Mar. 24, 2021, each of which is hereby incorporated by reference in its entirety.

FIELD OF THE INVENTION

The present invention relates to opto-mechanical systems. Specifically, the present invention concerns an opto-mechanical device aimed at extracting mechanical energy from a photon source (i.e., a laser source). In particular, the present invention relates to a photonic motor that exploits the principles of opto-mechanics, and more particularly to a photonic motor comprising at least one optical radiation input; a first optical waveguide arrangement, comprising a plurality of first optical resonators to form a static part of said photonic motor in a predetermined coordinate reference system of the photonic motor; an excitation optical waveguide arrangement coupled to said first optical waveguide arrangement at a predetermined optical mode coupling distance to at least one first optical resonator of the plurality of first optical resonators and configured to receive at least one optical radiation of predetermined wavelength from said at least one optical radiation input and to optically couple said at least one optical radiation to said at least one first optical resonator of the plurality of first optical resonators; and at least a second optical waveguide arrangement, comprising at least one second optical resonator configured to move with respect to said first optical waveguide arrangement according to at least one predefined direction of movement, so as to form a moving part of said photonic motor in the predetermined coordinate reference system of the photonic motor.

BACKGROUND OF THE INVENTION

Since 1821, Sir Michael Faraday adopted the magnetic force, generated by a current-carrying wire, to isolate and move continuously a magnetic pole in a coil. That was the first demonstration of an electric motor. In this kind of device, the magnetic flux requires a continuous inversion to allow the rotation of the electrical motor.

Considering both micro and macro scale applications, so far current technologies in the domain of rotary motors are the following:

a) Electrical motors and Micro-Electro-Mechanical-Motors (MEMS), based on the Faraday-Neumann-Lenz law, work on the interaction of magnetic fields and electric currents into conductor coils. The drawbacks regarding these devices are the construction limits in very small assemblies, restrained down to the millimeter scale, and the hazards rising from the use of high voltages and currents, always required in order to obtain useful torques.

b) Reciprocating and rotating combustion engines, typically fed by non-renewable fuels, causing pollution to the environment and related troubles, sized in the meter scale, and characterized by high operating temperatures and a number of hydraulic connections and moving mechanical components, thus reducing the reliability of the system.

c) Jet engines, e.g. gas turbines (such as in the form of Turboprop and Turboshaft) relying on Newton's 3rd Law of dynamics, and commonly based on the Joule-Brayton thermodynamic cycle; they are typically known for the highest temperature reached during operation. Dimensions are comparable to the ones of the aforementioned engines, but the acoustic and environmental pollution troubles associated to them are much higher.

d) Electromagnetic or chemical energy-driven molecular motors, able to perform rotary or linear motions;

e) Optical micro-motors, exploiting the radiation pressure deriving from the interaction between the light carried by an optical waveguide and a freely movable structure.

At present, the most challenging limitations for existing motors are a low deliverable power in the case of micro motors, or the substantial weight, size, and polluting emissions in the case of macro motors.

Radiation pressure generates optical forces inducing mechanical displacements in opto-mechanical systems. Cavity opto-mechanics principles are, however, the most efficient strategy to enhance the strength of the optical forces acting on the matter, obtained through improving the light-matter interaction occurring in resonant photonic systems. To date, the investigation of cavity-enhanced opto-mechanical systems is limited to linear displacement systems allowing unidirectional actuation.

US 2009/0116788 discloses controlling optical resonances between two spaced-apart, coupled strong-confinement photonic devices, wherein optical resonances are used to generate optically induced forces and achieve precise mechanical actuation in an opto-mechanical system made of the two coupled strong-confinement photonic devices. Axial approach or departure between two stacked photonic devices formed as ring resonators are disclosed.

The international patent application WO 2018/087789 by the same applicant describes a photonic motor adapted to efficiently convert optical power into mechanical torque.

Specifically, said application relates to a photonic motor comprising:

at least one optical radiation input;

a first optical waveguide arrangement, including at least one first optical resonator arranged in a first plane to form a static part of said motor in a predetermined coordinate reference system of the motor;

an excitation optical waveguide arrangement coupled to said first optical waveguide arrangement at a predetermined optical mode coupling distance to said at least one first optical resonator and configured to receive at least one optical radiation of predetermined wavelength from said at least one optical radiation input and to optically couple said optical radiation to said at least one first optical resonator;

at least a second optical waveguide arrangement, including at least one second optical resonator arranged in a second plane parallel to said first plane at a predetermined stacking distance perpendicular to said planes, the second optical waveguide arrangement being configured to move in said second plane with respect to said first optical waveguide arrangement according to at least a predefined direction of movement so as to form a moving part of said motor in the predetermined coordinate reference system of the motor, wherein said predetermined stacking distance is adapted to establish an evanescent-wave mode coupling of optical modes between at least one first optical resonator of said first optical waveguide arrangement and at least one second optical resonator of said second optical waveguide arrangement in a proximity condition of said first and second optical resonator in a plane transversal to said first and second plane where local motion of said second arrangement occurs, said first and second optical resonator being adapted to guide at least one resonant symmetric mode at a predetermined first wavelength or at least one resonant anti-symmetric mode at a predetermined second wavelength or at least a combination or superposition of at least one resonant symmetric mode at a predetermined first wavelength and at least one resonant anti-symmetric mode at a predetermined second wavelength, as a function of said stacking distance as well as of the distance between said first and second optical resonator on the transversal plane, and wherein when a resonant symmetric mode is selectively established an attraction condition of the said second optical resonator towards said first optical resonator is established that generates on said second plane a motion of approach of the second optical resonator towards the first optical resonator according to said predefined local direction of movement, or when a resonant anti-symmetric mode is selectively established a repulsion condition of the said second optical resonator from said first optical resonator is established that generates on said second plane a motion of departure of the second optical resonator from the first optical resonator according to said predefined local direction of movement.

An exemplary photonic resonant motor M of the prior art is disclosed that comprises an arrangement of two sets of wave-guiding photonic resonators, optically coupled one to the other and having the same rotation axis, that rotates mutually due to the generated asymmetric optical forces that are induced by the resonance phenomena and shown in FIG. 1a and 1b.

The opto-mechanical system of the photonic resonant motor M comprises two parallel planes lying in close proximity: a rotor plane $\Pi_R$, which is free to rotate, and a stator plane $\Pi_S$, which is at rest, depicted in FIGS. 1a and 1b.

The photonic motor M comprises:

at least one optical radiation input S;

a first optical waveguide arrangement, including at least one and preferably a plurality of first optical resonators 10, 20, 30, 40 and a master ring resonator MR arranged in the stator plane to form a static part of said motor in a predetermined coordinate reference system x, y, z of the motor;

an excitation optical waveguide arrangement, preferably including at least one excitation optical bus waveguide WG1, and in the depicted embodiment including a pair of excitation optical bus waveguides WG1 and WG2, coupled to said first optical waveguide arrangement at a predetermined optical mode coupling distance to the master ring resonator MR or more generally to at least one first optical resonator, and configured to receive at least one optical radiation of predetermined wavelength from the optical radiation input S and to optically couple said optical radiation to said at least one first optical resonator;

at least a second optical waveguide arrangement, including at least one and preferably a plurality of second optical resonators 10', 20', 30', 40' arranged in the rotor plane, parallel to the stator plane at a predetermined stacking distance perpendicular to said planes.

The second optical waveguide arrangement is configured to move in the rotor plane with respect to said first optical waveguide arrangement according to at least a predefined direction of movement so as to form a moving part of motor M in the predetermined coordinate reference system x, y, z of the motor.

In the exemplary embodiment depicted in FIGS. 1a and 1b the stator plane contains a number of optical ring resonators 10, 20, 30, 40 arranged in a circular geometry and simultaneously excited through the master ring resonator MR surrounding them. The rotor plane, similarly, contains preferably the same number of optical ring resonators 10', 20', 30', 40' arranged in the same fashion as in the stator plane. The rotor and stator planes are optically coupled through an evanescent coupling between mirrored ring resonators.

For certain input wavelengths of excitation, the photonic resonant motor rotates by tracking the wavelength of an optical source, thanks to the opto-mechanical torque generated through the radiation pressure force deriving from the coupling of the stator resonators with the rotor ones. The asymmetric optical forces associated to the resonant symmetric and anti-symmetric modes exciting the rings create useful torque on the rotor. An embodiment of the photonic resonant motor is shown in FIG. 1a, where a top view of the rotor and stator plane is sketched, and in FIG. 1b where a 3D view of the photonic resonant motor is reported.

Differently, FIGS. 2a-c show the cross sections of the stator plane and rotor plane when they are bonded via a mechanical joint made of silicon dioxide (supposed to be a built-in pin on the rotor and a corresponding recessed seat on the stator, shown in an exploded view in FIG. 2a), when the rotor is at rest (shown in FIG. 2b), and for small rotations ($\theta$) of the rotor with respect to the condition at rest (shown in FIG. 2c).

An example of implementation of a photonic resonant motor based on the interaction of optical resonators is described in the following.

The basic element (fundamental cell) of the photonic resonant motor includes two vertically stacked wave-guiding ring resonators, evanescently coupled each other. The vertical inter-ring distance is indicated q, the lateral stator ring-master ring distance is indicated d, while the lateral master ring—bus waveguide distance is indicated as g. By using the Finite Element Method (FEM), an association between the physical parameters q, d, and g and the fractions of the optical powers that regulate the spectral features of the photonic resonant motor may be found.

The whole optical resonant cavity is composed by a closed loop of N pairs of vertically stacked ring resonators (CVSRRs) of internal radius r, equally interspaced through a periodical circular distribution of period $2\pi/N$ rad. According to the disclosed exemplary embodiment N=4 and, thus, the four CVSRRs interact each other only through the closed loop consisting of a wider ring lying in the stator plane (i.e., coinciding with the plane where the bottom rings of the four CVSRRs are located) called 'master ring', whose radius $R_{MR}$ is chosen, together with q, in order to avoid the lateral cross-coupling between the master ring and the rotor rings.

The master ring is excited through one or two bus waveguides, WG1 and WG2, lying in the stator plane.

The photonic motor can be optically modeled by the transfer matrix method, the scattering matrix method and the coupled mode theory (CMT) as described in the following, by analyzing its basic element, consisting of two vertically stacked ring resonators, i.e. the top ring belonging to the rotor plane and the bottom one belonging to the stator plane, as depicted in FIG. 3a.

The optical feature of a single pair of VSRRs can be derived by Coupled Mode Theory (CMT) and, then, used to construct the transfer matrix associated to this pair (block).

By denoting with $\zeta$ the curvilinear coordinate along the two VSRRs, depending on axis x, y in the stator and rotor plane, the amplitudes of the optical signal propagating in the bottom and in the top rings are $a_1(\zeta)$ and $a_2(\zeta)$, respectively. The dependence of these two amplitudes on the curvilinear coordinate $\zeta$ can be modelled by CMT, which provides these two coupled differential equations:

$$\frac{1}{d\zeta}\begin{bmatrix} a_1 \\ a_2 \end{bmatrix} = \tag{1}$$

$$\frac{j\omega}{c}\begin{bmatrix} n_g & [n_{Sym}(q,\theta) - n_{Asym}(q,\theta)]/2 \\ [n_{Sym}(q,\theta) - n_{Asym}(q,\theta)]/2 & n_g \end{bmatrix}\begin{bmatrix} a_1 \\ a_2 \end{bmatrix} =$$

$$j\begin{bmatrix} \beta & k(q,\theta) \\ k(q,\theta) & \beta \end{bmatrix}\begin{bmatrix} a_1 \\ a_2 \end{bmatrix}$$

where j is the imaginary unit, $\omega$ is the angular frequency (i.e., $2\pi c/\lambda$ with c the speed of the light in vacuum and $\lambda$ the wavelength), $n_{Sym}$ and $n_{Asym}$ are the effective indices associated to the symmetric and anti-symmetric modes, respectively, while $n_g$ is the group index of a standing alone (unperturbed) waveguide. $n_{Sym}$ and $n_{Asym}$ can be evaluated by FEM by considering the electromagnetic distribution of the optical field in the cross section of two coupled waveguides, while $n_g$ results from the electromagnetic analysis of the cross section of the unperturbed standing alone waveguide. It is important to notice that $n_{Sym}$ and $n_{Asym}$ are functions of the distance $\zeta$ between the cross sections of the two coupled optical waveguides, that can be evaluated through considering the distance between the centers of the two VSRRs as shown in FIG. 4.

This distance $\zeta$ depends on the vertical distance q between the two VSRRs and on the rotation angle $\theta$ once fixed the distance R between the rotation axis and the ring centers. In other words, with reference to the structure depicted in FIG. 1, by isolating a single pair of VSRRs in FIG. 4, a rotor ring is able to rotate of an angle $\theta$ thus affecting the electromagnetic field distribution and, in turn, $n_{Sym}$ and $n_{Asym}$. So, the rotatory dynamics of the system is considered through the rotatory dependence of $n_{Sym}$ and $n_{Asym}$ in Eqn. (1). In the third member of Eqn. (1), $\beta$ is the propagation constant of the unperturbed waveguide (i.e., $\beta = 2\pi n_{eff}/\lambda = \omega n_{eff}/c$), k is the propagation constant, function of q and $\theta$, associated to the combination of $n_{Sym}$ and $n_{Asym}$.

By neglecting the propagation losses, the two general solutions $a_1(\zeta)$ and $a_2(\zeta)$, of the system described by Eqn. (1), are:

$$\begin{bmatrix} a_1(\zeta) \\ a_2(\zeta) \end{bmatrix} = \tag{2}$$

$$\begin{bmatrix} \cos(k(q,\theta)\zeta)\exp\left(j\beta\zeta - \frac{\alpha}{2}\zeta\right) & j\sin(k(q,\theta)\zeta)\exp\left(j\beta\zeta - \frac{\alpha}{2}\zeta\right) \\ j\sin(k(q,\theta)\zeta)\exp\left(j\beta\zeta - \frac{\alpha}{2}\zeta\right) & \cos(k(q,\theta)\zeta)\exp\left(j\beta\zeta - \frac{\alpha}{2}\zeta\right) \end{bmatrix}\begin{bmatrix} a_1(0) \\ a_2(0) \end{bmatrix}$$

The two amplitudes $a_1(0)$ and $a_2(0)$ can be determined by imposing boundary conditions. The first boundary condition is:

$$a_2(L) = a_2(0) \tag{3}$$

Eqn. (3) is a closure condition due to the circular shape and due to the condition that the upper ring is only coupled with the lower ring and not with the master ring. L is the average perimeter of each ring of the pair of VSRRs (i.e., $L = 2\pi r$)

By supposing the presence of a single excitation source (i.e., $E_{i1}$ in FIG. 3b)), the coupling between the master ring and one of the lower rings is modelled by the following transfer matrix:

$$\begin{bmatrix} E_t \\ a_1(0) \end{bmatrix} = \begin{bmatrix} \tau & jh \\ jh & \tau \end{bmatrix}\begin{bmatrix} E_{i1} \\ a_1(L) \end{bmatrix} \tag{4}$$

where $E_{il}$ is the amplitude of the signal on the master ring before interacting with a pair of VSRRs, and $E_t$ is the amplitude of the signal in the master ring after the interaction with a pair of VSRRs (See FIG. 3a)). The second equation of the system of Eqns. (4) rules the second boundary condition as:

$$a_1(L) = \frac{a_1(0) - jhE_{i1}}{\tau} \tag{5}$$

By imposing the two boundary conditions (Eqns. (3) and (5)) to the equation system in Eqns. (2), we obtain:

$$a_1(L) = -\frac{jhe^{j\beta L}\left[e^{j\beta L} - \cos(k(q,\theta)L)\right]}{1 + \tau e^{2j\beta L} - (1-\tau)e^{j\beta L}\cos(k(q,\theta)L)}E_{i1} \tag{6}$$

Once an order of resonance m is fixed, the resonance conditions (obtained by imposing the denominator of Eqn. (6) equal to zero) occur for $\omega \approx \omega^m_{\pm}$, where $\omega^m$+ is the symmetric resonance frequency and $\omega^m$_ is the anti-symmetric one. These resonances are combinations of the difference between $n_{Sym}$ and $n_{Asym}$ and their expressions are given by:

$$\omega^m_{\pm} \approx \omega_m \mp \frac{\omega_m}{2}\left(\frac{n_{Sym}(q,\theta) - n_{Asym}(q,\theta)}{n_g}\right) = \tag{7}$$

$$\omega_m \mp \frac{\omega_m}{n_g}k(q,\theta) \xrightarrow{\frac{\Delta\omega}{\omega} = -\frac{\Delta\lambda}{\lambda}} \lambda^m_{\pm} \approx \lambda_m \pm \frac{\lambda_m}{n_g}k(q,\theta)$$

where $\omega^m$ is the resonance frequency ($\lambda_m$ is the resonance wavelength) of a single ring resonator (on the stator plane) occurring when the distance between the two VSRRs is large enough to avoid the interaction between them.

$\omega^m(\lambda_m)$ is given by:

$$\omega_m = \frac{2cm\pi}{Ln_{eff}} \rightarrow \lambda_m = \frac{Ln_{eff}}{m} \tag{8}$$

The resonance condition corresponds to the condition for which $\omega L/c = 2\pi m$, with m corresponding to the resonance order. By combining Eqns. (4) and (6), we derive the optical field amplitude transmitted on the master ring through a pair of VSRRs as:

$$t(\lambda, q, \theta) = \frac{E_t}{E_{in}} = \tau + \frac{h^2 e^{j\beta(\lambda)L}\left[e^{j\beta(\lambda)L} - \cos[k(q, \theta)L]\right]}{1 + \tau e^{2j\beta(\lambda)L} - (1 - \tau)e^{j\beta(\lambda)L}\cos[k(q, \theta)L]} \tag{9}$$

The model has been validated through three-dimensional Finite Difference Time Domain (3D-FDTD) method.

The optical wave-guiding structures, forming the ring resonators and the two bus waveguides of the photonic resonant motor, are preferably silicon wires (silicon refractive index $n_{Si}$=3.45) characterized by a cross section of width W=500 nm and height H=300 nm. The rotor silicon ring resonators and the stator ones are anchored to two silicon dioxide disks (refractive index $n_{SiO2}$=1.46), belonging to two different silicon substrates. The two different rotor and stator planes are bonded via a mechanical joint made of silicon dioxide (supposed to be a built-in pin on the rotor and a corresponding recessed seat on the stator) and surrounded by air ($n_{air}$=1).

The wave-guiding components are preferably realized with silicon photonics technology, allowing extreme miniaturization of the integrated optics devices and, thus, an improvement of opto-mechanical effects due to the strong light-matter interaction that can be used as fundamental strategy for the best performance of the photonic resonant motor.

In the particular case of a pair of vertically stacked ring resonators, it is considered the eigenvalues grid, obtained by finding the resonance wavelengths that zero the denominator of Eqn. (9). In FIG. 5a the mode-splitting dynamics when θ=0 [rad] and q, the vertical distance, is a free parameter (i.e., the two VSRRs are free to move in the axial direction) is depicted. For simplicity, we can rename k(q,0) as k(q), and the asymmetric resonances, associated with the mode-splitting, result to be ruled by:

$$\lambda^m_\pm(q) \approx \lambda_m \pm \frac{\lambda_m}{n_g}k(q) \tag{10}$$

By fixing q=q* (i.e., by fixing the distance associated to the vertical coupling in order to operate in a condition below to the 'trapping' condition, as disclosed in P. T. Rakich, M. A. Popović, M. Soljačić, and E. P. Ippen, "Trapping, corralling and spectral bonding of optical resonances through optically induced potentials," Nat. Photonics 1(11), 658-665 (2007), corresponding to the crossing of two asymmetric resonances of two contiguous resonant orders) and by considering the rotor ring free to rotate by an angle θ with respect to the stator ring, the mode-splitting dynamics of the rotating structure can be evaluated through $$k)q^*,\theta)=[n_{Sym}(q^*,\theta)-n_{Asym}(q^*,\theta)]/2.$$

Intuitively, with reference to the embodiment of the photonic motor in FIG. 1, characterized by 4 pairs of VSRRs distributed in a circular arrangement, the same mode-splitting condition that occurs for θ=0 in a single pair of VSRRs, will occur for θ=2πp/N (p is an integer and N is the overall number of pairs of VSRRs as depicted in FIG. 5b).

At the angular conditions θ=(2p+1)π/N the rotor ring resonator is fully decoupled from the all stator ring resonators and no electromagnetic energy is exchanged between rotor and stator ring resonators. In the transmission spectrum, this condition is visible as the disappearing of the mode-splitting since the two resonance lines coincide with the resonance line of the standing alone stator ring resonator ($\lambda^m_\pm \approx \lambda_m$). Additionally, due to the continuity of the eigenvalues and to the rotatory symmetry, i.e. $\lambda^m_\pm(\theta^*)=\lambda^m_\pm(-\theta^*)$, the mode-splitting dynamics is characterized by minima displaced at $\lambda^m_\pm \approx \lambda_m$ for angles θ=(2p+1)π/N, and maxima displaced at:

$$\lambda^m_\pm \approx \lambda_m \pm \frac{\lambda_m}{n_g}k(q*) \tag{11}$$

for angles θ=2πp/N. In particular, the rotatory mode-splitting dynamics is ruled by:

$$\lambda^m_\pm(\theta) \approx \lambda_m \pm \frac{\lambda_m}{n_g}[n_{Sym}(q*, \theta) - n_{Asym}(q*, \theta)]/2 \tag{12}$$

The conditions expressed through Eqns. (10)-(12) are graphically represented in FIG. 5 where the mode splitting dynamics is reported with reference to a single pair of VSRRs. In FIG. 5a the inter-rings distance q is variable, while the rotation angle θ is null: differently, in FIG. 5b the inter-ring rotation angle θ is varied from θ to 2π while q is fixed to q*.

Now, reverting back to considering the geometrical construction reported in FIG. 4, where ζ is the distance between the two centres of the two rings of a single pair of VSRRs, q-q* is a fixed vertical distance between the two VSRRs, R is the distance between the rotation axis and the VSRRs centres, θ is the rotation angle of the rotor ring with respect to the corresponding stator ring, and the zero reference angle for rotations (θ=0) is assumed to be in the configuration of perfect stacking, the following description assumes validity for small rotation angles near θ=0 and θ increasing only in positive direction (dθ>0, i.e. always maintaining the same direction of rotation).

The physical parameters of the optical resonators, including geometrical features of the wave-guiding rings and their cross sections, converge into an equivalent concentrated point coinciding with the geometrical center of each ring resonator (placed at a distance R from the rotation axis). With this assumption, the opto-mechanical theory focuses on a lumped model enabling the study of the mutual forces acting along the moving line connecting those points (i.e., see $P_S$ and $P_R$ the stator and rotor equivalent points in FIG. 6a).

The mechanical behavior of the photonic resonant motor is ruled by opto-mechanical force $F_\zeta$, due to the cavity-enhanced radiation pressure, acting between $P_S$ and $P_R$. $F_\zeta$ can be derived by a quantum argument or classical argument, being that force generated between two weakly-coupled resonators, as disclosed by M. L. Povinelli, Steven G. Johnson, Marko Lončar, Mihai Ibanescu, Elizabeth J. Smythe, Federico Capasso, and J. D. Joannopoulos, "High-Q enhancement of attractive and repulsive optical forces between coupled whispering-gallery-mode resonators," Opt. Express 13, 8286-8295 (2005). Its expression is given by:

$$F_\xi = \tag{17}$$

$$-\frac{1}{\omega_0^2}\frac{d(\Delta\omega)}{d\xi}PQ_m \xrightarrow{\omega=\frac{2\pi c}{\lambda}\to\delta\omega=-\frac{2\pi c}{\lambda^2}\delta\lambda\to\Delta\omega=-\frac{2\pi c}{\lambda^2}\Delta\lambda} F_\xi = \frac{1}{2\pi c}\frac{d(\Delta\lambda)}{d\xi}PQ_m$$

where P is the optical power circulating in a single pair of VSRRs, and P is given by:

$$P=P_iE_N \tag{18}$$

where $P_i$ is the input source (e.g., laser) power and $E_N$ is the power enhancement factor (Eqn. 16):

and where $Q_m$ is the quality factor of a standing alone ring resonator, referred to the m-th resonance order, that can be evaluated for angular conditions $\theta=(2p+1)\pi/N$ (non-coupling condition).

The resonant electromagnetic energy $U_r$ stored in a single stator ring is given by:

$$U_r = \frac{\lambda_m}{2\pi c}PQ_m \tag{19}$$

With the assumption of small rotation angles near the zero reference angle it can be considered the linearized distance $R\theta$ (corresponding to the projection of the distance $\zeta$ on x-y plane, see FIG. 6b and FIG. 4a) instead of the chord length. Thus, $\zeta$ can be expressed as:

$$\zeta=\sqrt{R^2\theta^2+q^{*2}} \tag{20}$$

By considering Eqn. (20) and Eqn. (21), $\Delta\lambda(\theta)=\lambda_m^\pm(\theta)-\lambda_m$ where d $(\Delta\lambda(\theta))=$d $(\lambda_m^\pm(\theta))\approx$d$(\lambda_{pm}^\pm(\theta))$, Eqn. (17) may be expressed as:

$$F_\xi \approx \frac{1}{2\pi c}\frac{d(\Delta\lambda(\theta))}{d(\xi(\theta))}PQ_m = \tag{21}$$

$$\frac{1}{2\pi c}\frac{d(\Delta\lambda(\theta))}{d\theta}\frac{d\theta}{d(\xi(\theta))}PQ_m \approx \pm\frac{r\sqrt{R^2\theta^2+q^{*2}}}{2R^2\theta mc}\frac{d(n_{Sym}(\theta)-n_{Asym}(\theta))}{d\theta}PQ_m$$

We conventionally define as negative the attractive forces, associated to the symmetric resonance line, and as positive the repulsive forces, associated to the anti-symmetric resonance line. Thus, $F_\zeta$ may be expressed as $F_{\zeta\lambda}^+$ and $F_{\zeta\lambda}^-$, for the symmetric and the anti-symmetric resonance line, i.e., $\lambda_{pm}^+$ and $\lambda_{pm}^-$, respectively:

$$F_{\xi\lambda^+} = -\frac{r\sqrt{R^2\theta^2+q^{*2}}}{2R^2\theta mc}\frac{d(n_{Sym}(\theta)-n_{Asym}(\theta))}{d\theta}PQ_m[N] \tag{22}$$

$$F_{\xi\lambda^-} = +\frac{r\sqrt{R^2\theta^2+q^{*2}}}{2R^2\theta mc}\frac{d(n_{Sym}(\theta)-n_{Asym}(\theta))}{d\theta}PQ_m[N] \tag{23}$$

Due to the reduction to the lumped equivalent system, $F_{\zeta\lambda}^+$ and $F_{\zeta\lambda}^-$ act along $\zeta$ (i.e., the moving line connecting the centers of the coupled stator and rotor rings). With reference to the angle $\gamma$ (see FIG. 6b), defined as:

$$\gamma = arctg\left(\frac{R|\theta|}{q^*}\right) \tag{24}$$

two particular projections of the overall force $F_{\zeta\lambda}^{+(-)}$ are considered: the axial component, $F_{z\lambda}^{+(-)}$ and the tangential component $F_{\theta\lambda}^{+(-)}$, given by:

$$F_{z\lambda}^{+(-)}F_{\zeta\lambda}^{+(-)}\cos(\gamma)[N] \tag{25}$$

$$F_{\theta\lambda}^{+(-)}F_{\zeta\lambda}^{+(-)}\sin(\gamma)[N] \tag{26}$$

$F_{z\lambda}^{+(-)}$ is balanced by the reaction forces given by the external frame, while $F_{\theta\lambda}^{+(-)}$ causes the motion of the rotor.

With reference to the specific configuration of the photonic motor reported in FIGS. 1 and 2, where N=4, in FIG. 7 the curve representing the opto-mechanical force distribution for the symmetric resonance line $\lambda^+$ (see eigenvalues grid in FIG. 5b) is reported as a function of the rotation angle. The opto-mechanical force distribution for the anti-symmetric resonance line $\lambda$ is inverted with respect to the symmetric one and it is not reported for simplicity.

The torque $C_1(\theta)$ exerted by a single pair of coupled rings and acting on the rotor is computed, by multiplying the value of the tangential force $F_{\theta\lambda}^{+(-)}$ by the distance R from the point $P_R$ to the rotation axis. As stated before, this assumption (implying perpendicular directions for $F_{\theta\lambda}^{+(-)}$ and R) is acceptable when considering small rotation angles near the zero reference angle:

$$C_1(\theta)=F_{\theta\lambda}^{+(-)}\cdot R[Nm] \tag{27}$$

In the presented configuration (N=4 CVSRRs, equally interspaced over $2\pi$ rad), N in-phase functions may be summed in order to obtain the overall torque $C(\theta)$:

$$C(\theta)=N\cdot C_1(\theta)[Nm] \tag{28}$$

It is easy to notice that the overall torque linearly increases with increasing dynamic parameter $F_{\theta\lambda}^{+(-)}$ and topological/geometrical parameters N and R.

FIG. 8 discloses the opto-mechanical torque distribution for the symmetric resonance line $\lambda^+$ as a function of the rotation angle $\theta$.

One of the techniques through control means that can be used to sustain the rotation in such a system and extract useful torque from the rotor is a synchronous timing: when working with the symmetrical resonance line (attractive forces), it is required to keep the (laser) source active only during the approaching phase and to turn it off when the rotor rings are in perfect stacking condition with the corresponding stator rings. After this phase, due to the inertia forces, the rotor will keep its motion until it reaches the next evanescent wave coupling condition, with a different stator ring.

An alternative to this technique through control means consists in working with the anti-symmetrical resonance line (repulsive forces), turning on the (laser) source only when the rotor rings are in perfect stacking condition with the corresponding stator rings and maintaining it switched on during the entire escaping phase, until the optical coupling between the facing rings drops down.

Another method consists in using a combination of the previous, ensuring a switch from attraction (during approaching phase) to repulsion (during escaping phase).

A more complex, but efficient, technique that can be applied to obtain full motion control is represented by a step-by-step architecture: considering, as an example, the symmetrical resonance line (attractive forces) a single stator ring, when active, attracts the nearest rotor ring, until it gets trapped in the local zero position (stacking condition). In order to obtain a second movement (step), a driver unit turns off the previous stator ring and activates the next one. The aforementioned rotor ring leaves its actual position because it gets attracted by a different stator ring, and pulls the whole rotor until it reaches the new settling position. This mechanism repeats (even along both directions of rotation) according to the actions imposed by the driver unit.

A photonic motor of the type described in the prior art disadvantageously has a high technological complexity due to the need to construct the rotor and stator on different substrates, with techniques that are not yet established in the field of micromachining on silicon. Further, it presents the difficulty of having to maintain a fixed stacking distance between the rotor and stator during the operation of the motor, since during the operation of the motor the out-of-plane mechanical oscillations may affect the stacking distance, making the performance of the motor uncontrollable.

SUMMARY OF THE INVENTION

The object of the present invention is to provide a planar photonic motor that exhibits a lower technological complexity of construction and operation.

According to the present invention this object is achieved by a photonic motor as described and claimed herein.

Particular embodiments are also described.

Specifically, the invention relates to a planar photonic motor, comprising a first arrangement of optical waveguides—comprising a plurality of first optical resonators—forming a static part of said motor or stator and a second arrangement of optical waveguides—comprising at least one second optical resonator—forming a movable part of said motor or rotor, which lie in a respective first and second region of space of a common plane, separated from each other by a predetermined lateral coupling distance, wherein the second arrangement of optical waveguides is configured to move in the second plane region with respect to the first arrangement of optical waveguides.

The lateral coupling distance is adapted to establish an evanescent wave coupling of the optical modes between at least one first optical resonator of the first optical waveguide arrangement and at least one second optical resonator of the second optical waveguide arrangement, in a proximity condition of the first and second optical resonators, whereby an attraction or repulsion condition of the second optical resonator toward, respectively from, the first optical resonator is created, which generates an approaching, respectively receding, motion of the second optical resonator toward, respectively from, the first optical resonator according to a predefined local direction of motion.

The invention further relates to a photonic motor assembly, including a plurality of elementary units each comprising a photonic motor as defined above, said elementary units being mechanically coupled on a plane or in a three-dimensional volume.

The present invention is based on a distribution gradient of the electromagnetic field generating optical forces inducing mechanical displacements in opto-mechanical systems.

According to an aspect of the invention, an opto-mechanical system, where optical forces are generated through preferably circular arrangements of resonators, lying on two coplanar regions of space in relative motion, preferably rotating, and behaves like a photonic resonant motor. A photonic resonant motor is a cavity-enhanced opto-mechanical rotating system conceived by means of coupled resonator dynamics and may be advantageously manufactured as a miniaturized system employing silicon photonics and silicon micro-machining techniques. Emerging semiconductor manufacturing technologies such as silicon photonics allow fabrication of opto-mechanical micro systems where the relative force strength is enhanced by the miniaturized dimensions. Consolidated manufacturing technologies by means of micromachining on silicon allow the construction of the assembly and support structure of the motor, and allow scale constructions of the structure.

An embodiment of the present invention includes a photonic resonant motor that utilizes photonic resonant structures to convert electromagnetic forces in order to generate useful mechanical energy. Such a photonic resonant motor can be actuated through an optically-induced force generated by tracking the wavelength of an optical signal (i.e., a laser source). Specifically, an arrangement of optically coupled optical resonators, rigidly connected to the same rotation axis according to an aspect of the invention, relatively revolves thanks to the generated asymmetric optical forces, induced by the resonance phenomena.

The photonic resonant motor is essentially a motor powered by a coherent radiation source (i.e., a laser beam) exciting a waveguides structure. It presents an input that allows the photons to enter into an electromagnetic waveguide that excites an arrangement of optical resonators distributed over two coplanar regions of space in relative motion (e.g., sliding planes, rotating systems, etc.). While the fundamental building blocks may be manufactured in different shapes, the disclosed exemplary embodiment adopts a circular shape for both the resonant elements and the moving regions of space, and one of the regions of space in relative motion is fixed while the other one is free to rotate.

According to an aspect of the invention, a photonic motor may include one or more electromagnetic resonators. Specifically, the photonic motor may include one or more arrangements of optical resonators, optically coupled through two coplanar regions of space in relative rotation. In this embodiment, the photonic motor should comprise at least two regions of space of a common plane in close proximity: a region of rotor space, free to rotate, and a region of stator space, in a fixed position. According to an aspect of the invention, the stator region of space comprises a certain number of optical closed paths, hereinafter named as 'ring resonators,' that may be preferably, but not exclusively, arranged in a circular geometry and excited through one or more internal or external electromagnetic resonators (master electromagnetic resonators), such as a master ring resonator surrounding them. The master ring resonator may be excited through one or more bus waveguides (excitation waveguides). The rotor region of space, similarly, contains a number of optical ring resonators, the amount of which is related to the number of ring resonators positioned in the stator region of space, preferably arranged as in the stator region of space. Rotor and stator coplanar regions of space are optically coupled through evanescent coupling. The asymmetric optical forces, associated to the asymmetric resonant modes, enable the generation of opto-mechanical torque. It is possible to trap the momentum of the photons through a multi-resonator cavity-enhanced system and extract a useful opto-mechanical torque.

The rotor and the stator regions of space may be built with two semiconductor wafers, manufactured by using conventional micro-manufacturing techniques widely adopted in the photonics and MEMS technology industry. The optimal mechanical conditions allowing the relative rotation between rotor and stator can be obtained by adopting specific micro-mechanical solutions already available in the current technology landscape.

For opportunely chosen wavelengths of excitation, the photonic resonant motor passively rotates or translates by tracking the wavelength of an optical source, under the torque generated through the evanescent coupling of the resonators in the coplanar regions of space of the rotor and the stator, thereby generating an optical-induced torque. The asymmetric optical forces associated with the resonant symmetric and anti-symmetric modes with which the resonators contained in the photonic motor are excited enable the generation and exploitation of an opto-mechanical torque that occur between the rotor and the stator.

In addition to the wide range of practical applications, some of which have already been mentioned above, the photonic resonant motor demonstrates how it is physically possible to trap the momentum of photons, through an optical cavity-enhanced system, for extracting an opto-mechanical torque from the light-matter interaction.

The fundamental building blocks of the photonic resonant motor consist of optical ring resonators, respectively belonging to a stator region of space and rotor region of space, mutually evanescently coupled, in which the lateral coupling distance between the coplanar regions of space of the stator and rotor, the lateral distance between the master ring and stator rings, and the lateral distance between the master ring and the bus waveguide (excitation waveguide) determine the optical power distribution in each ring, which consequently governs the spectral features of the photonic resonant motor. The ring resonators may or may not have congruent shapes and sizes, and their ring shape may be circular, elliptical, or according to any other closed curve. In a general embodiment, the photonic resonant motor includes a pair of rings, for example concentric, of N, M ring resonators, for example, but not exclusively, arranged uniformly in a circular periodic distribution of period $2\pi/N$, respectively $2\pi/M$. A different number of resonators between the stator region of space and the rotor region of space is useful in determining an imbalance of forces. In a preferred embodiment, the photonic resonant motor includes N pairs of ring resonators, for example, but not necessarily arranged uniformly in a circular periodic distribution of period $2\pi/N$. In a different embodiment, the photonic resonant motor includes two linear arrangements, for example, but not exclusively, of equal numbers of ring resonators and uniformly arranged in a periodic distribution.

Although two different optical modes (Quasi-TE and Quasi-TM) can be supported by the waveguides, only the fundamental mode (Quasi-TE) is selectively excited in a number of ways, for instance by adjusting the polarization of the laser source.

Advantageously, by adopting the prior art from micromachining on silicon and constructing the rotor and stator on the same substrate, a fully planar photonic motor structure is obtained, which allows the problem of motor control in the case of out-of-plane mechanical oscillations to be solved. This opto-mechanical actuator architecture is a viable opto-mechanical alternative to Optical MEMS electrostatic actuators for applications in consumer goods (e.g., head-up displays, projectors, TV-lasers, pico-projectors and auto-focus systems), automotive (e.g., LiDAR), biomedical (e.g., micro-endoscopes), space and telecommunications (e.g., optical switches), MEMS electrostatic sensor applications (including, but not limited to, gyroscopes and accelerometers), and MEMS actuators (including, but not limited to, microturbines and microvalves).

BRIEF DESCRIPTION OF THE FIGURES

Further characteristics and advantages of the invention will be disclosed in more detail in the following description of preferred embodiments, given by way of non-limitative example, referring to the appended drawings, where.

DETAILED DESCRIPTION

Figure 1:
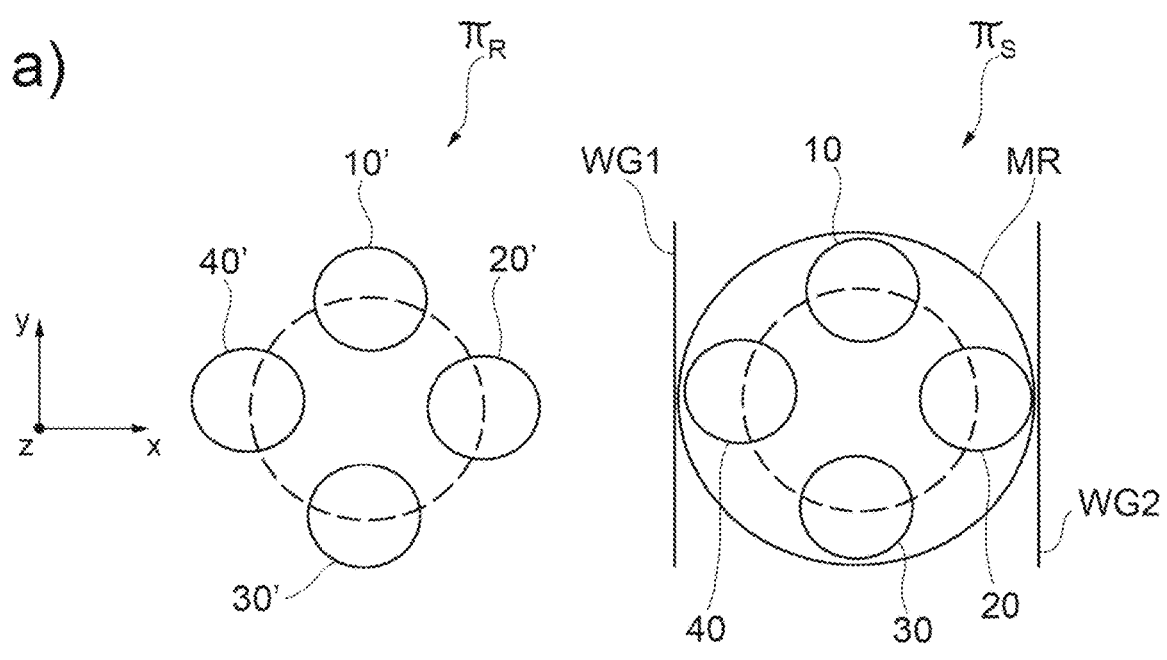
FIG. 1 through 8 have been described with reference to the prior art.
Figure 1:
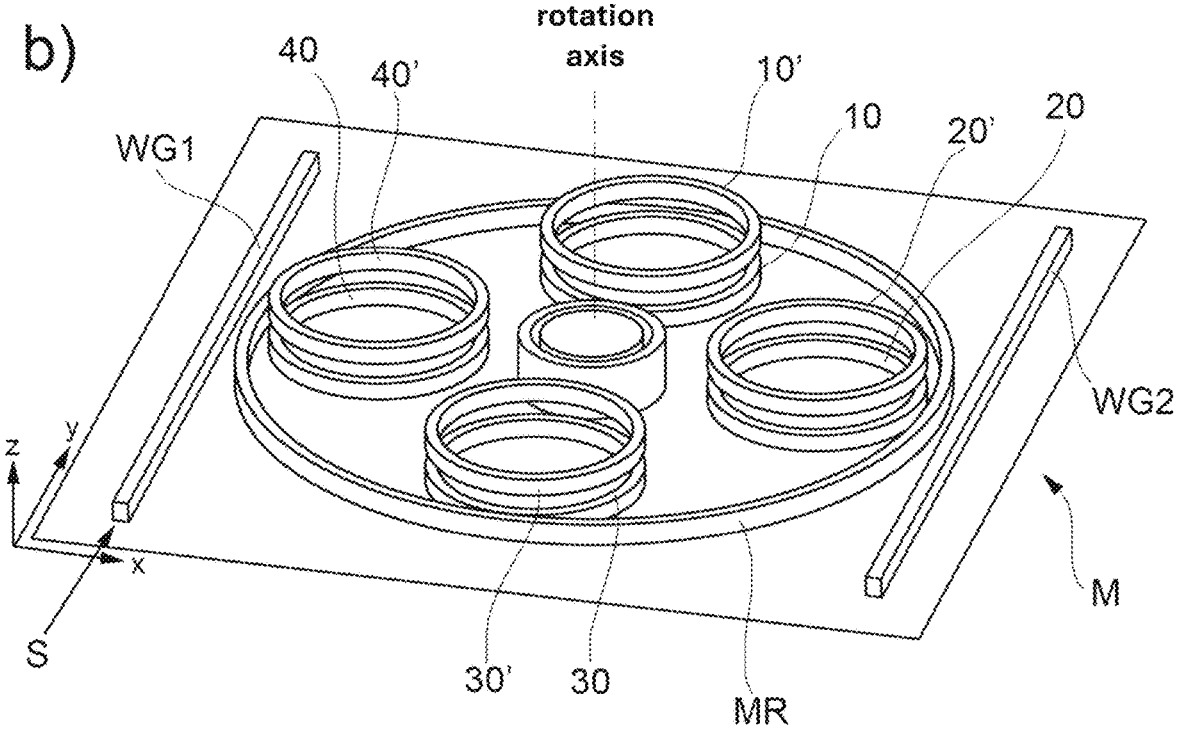
Figure 2:
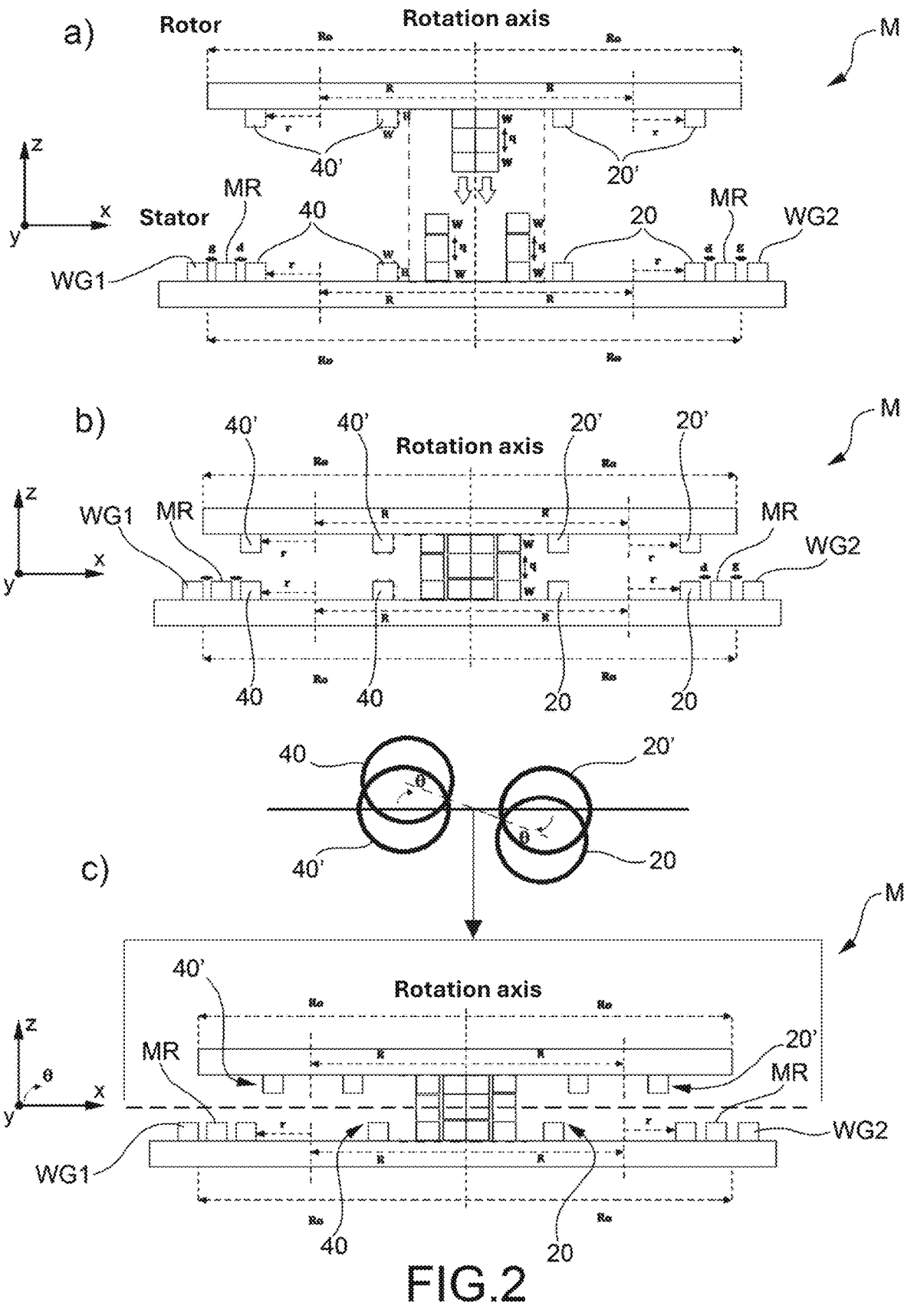
Figures 3, 4:
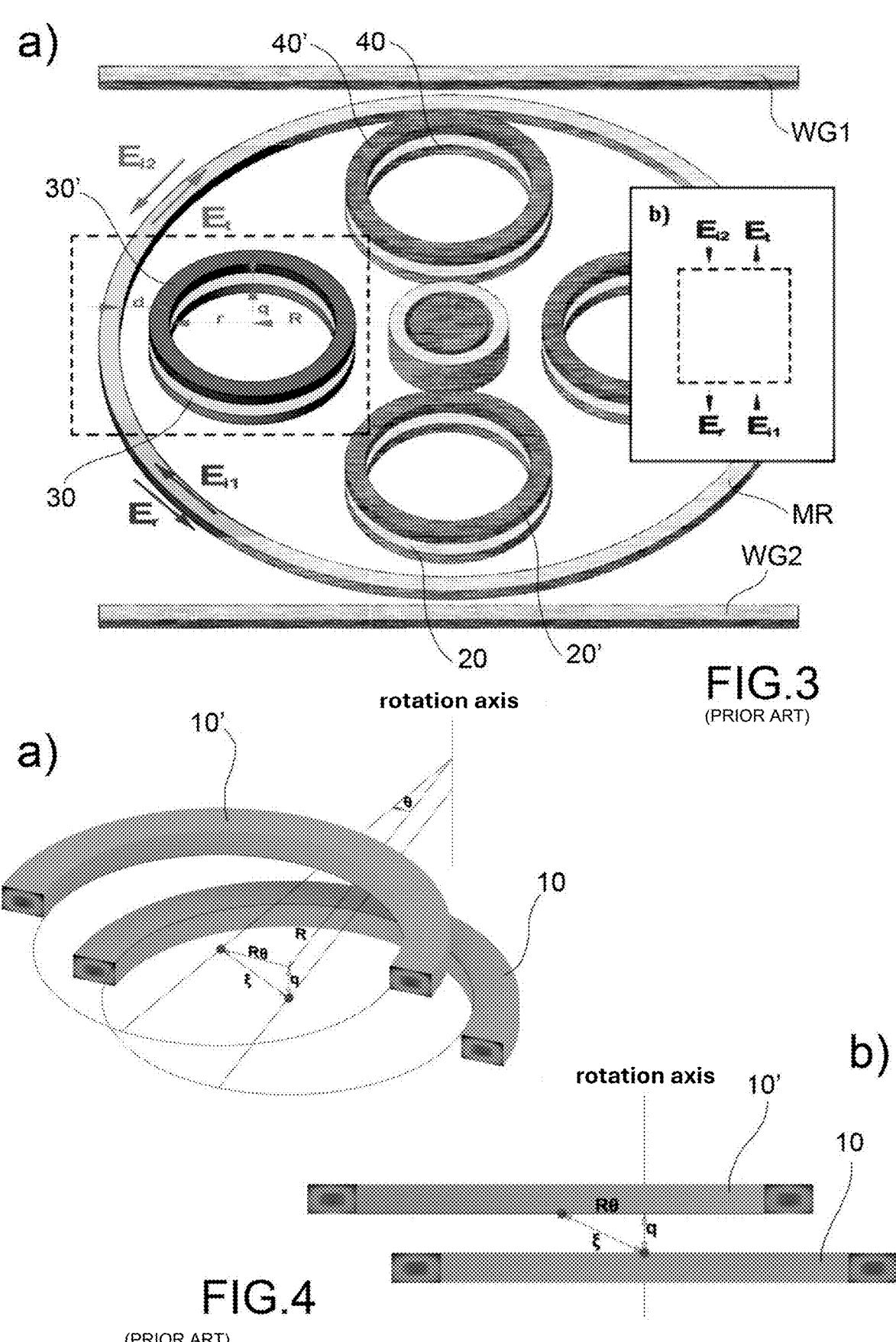
Figure 5:
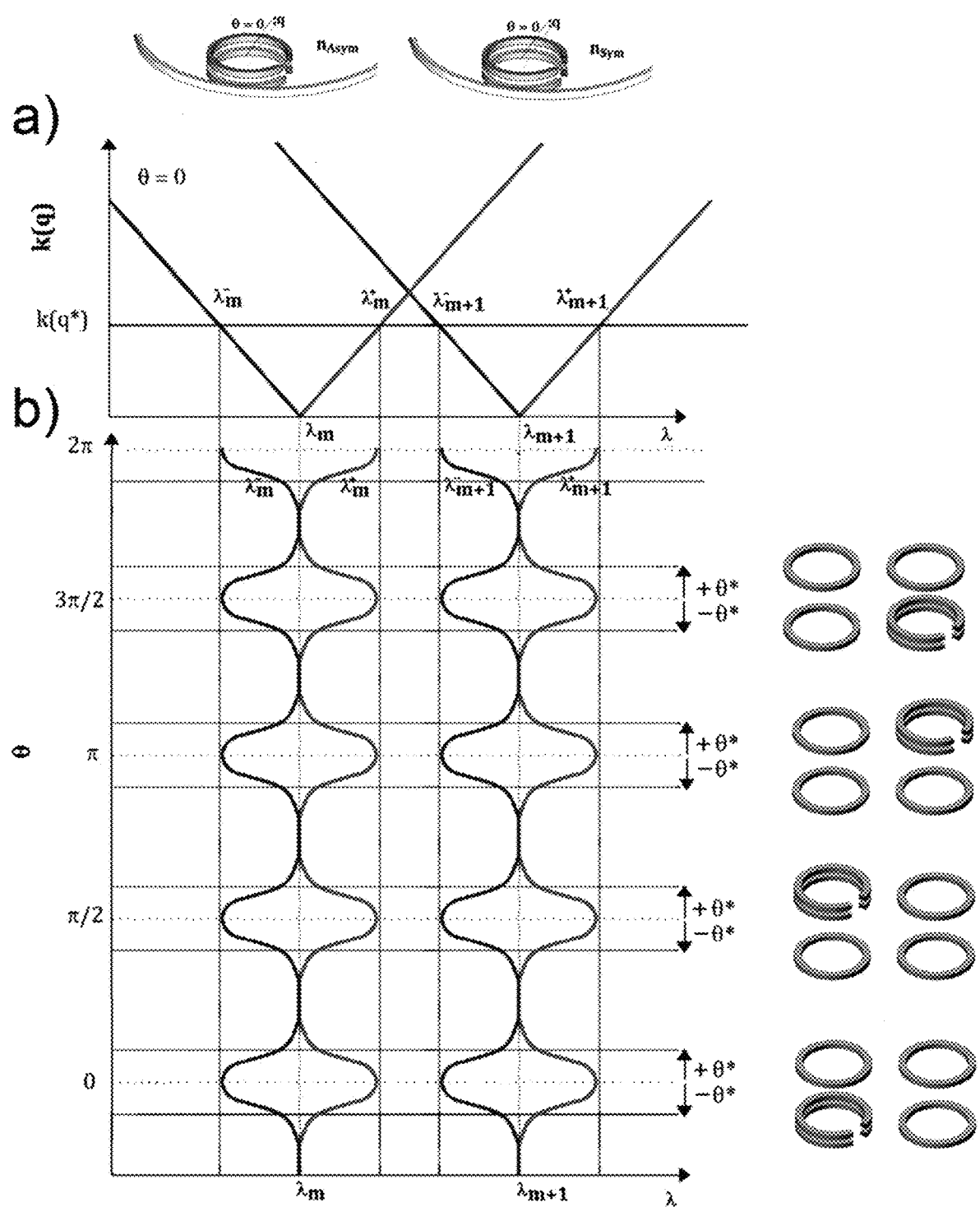
Figure 6:
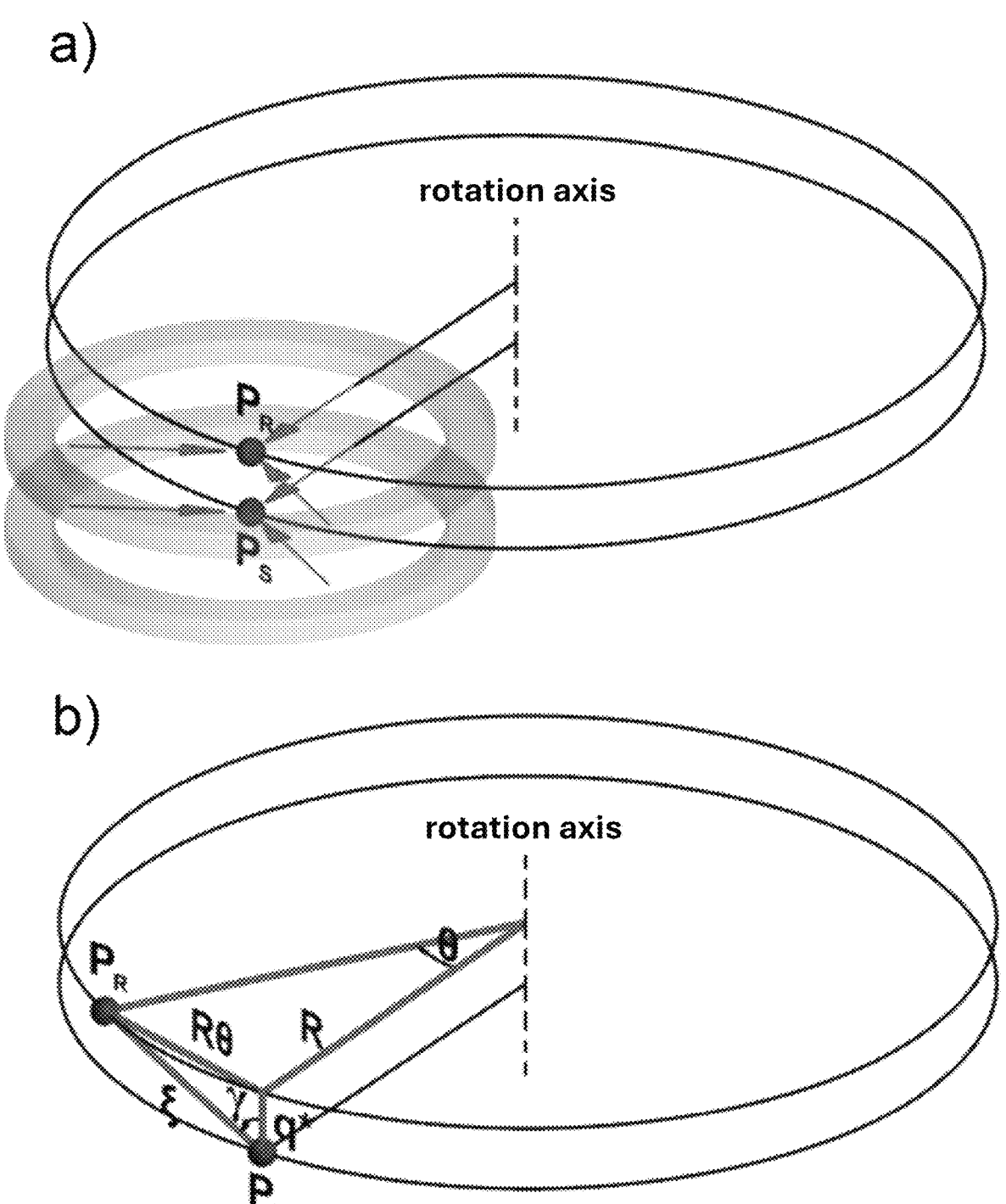
Figure 7:
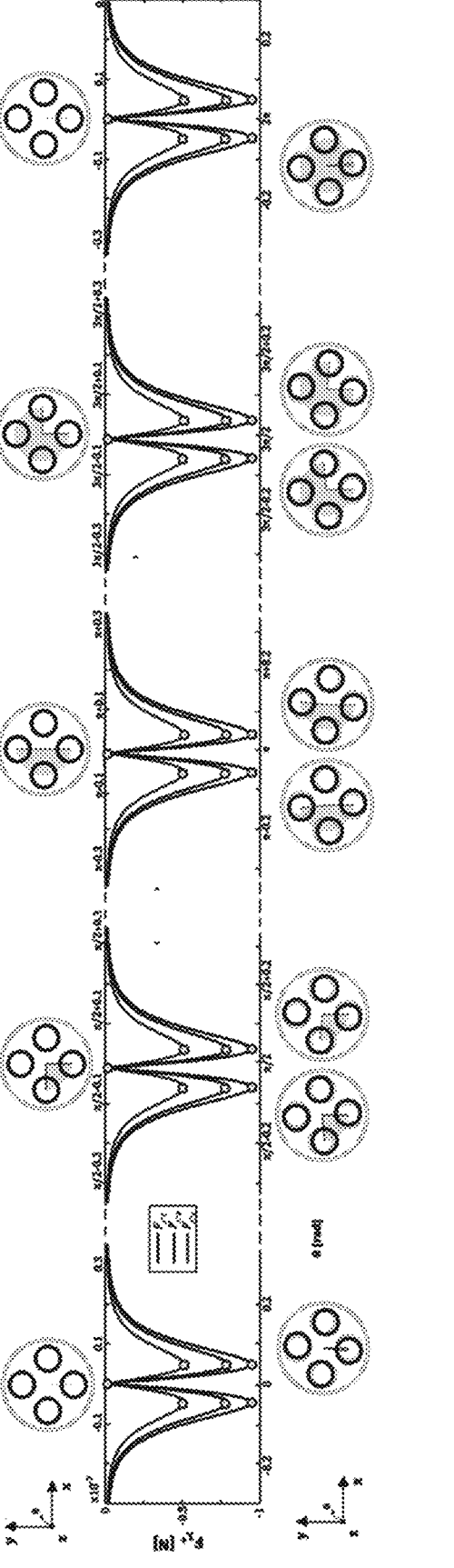
Figure 8:
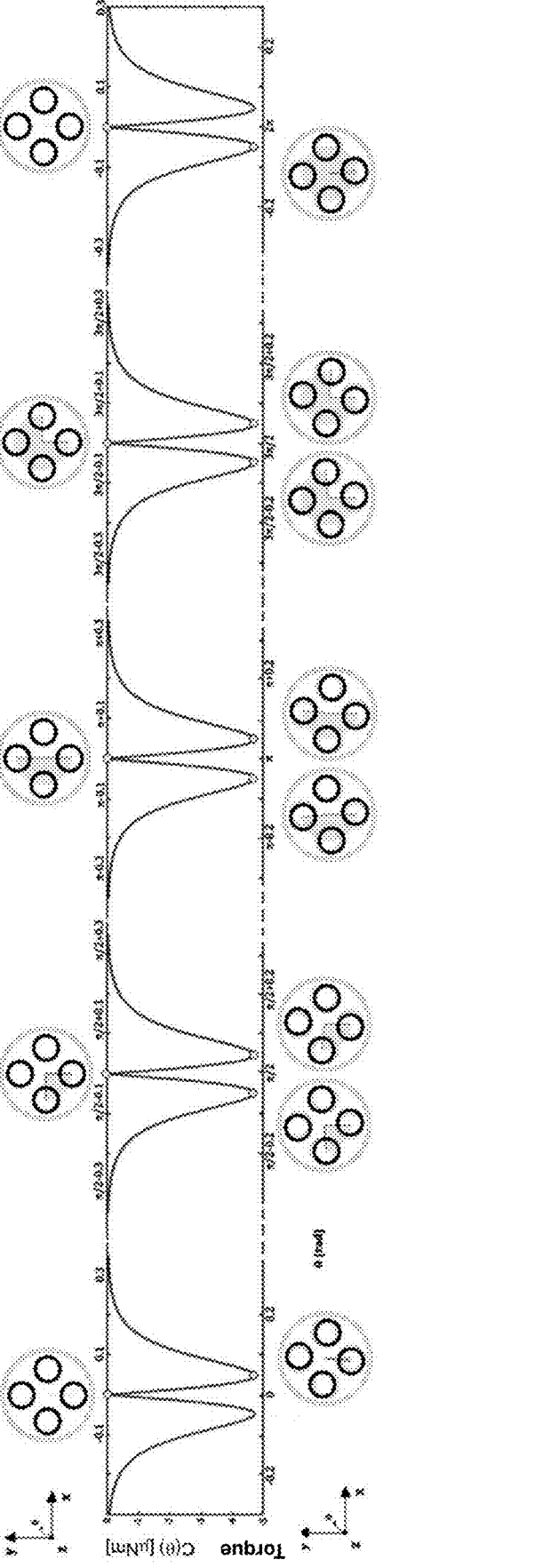
Figure 9:
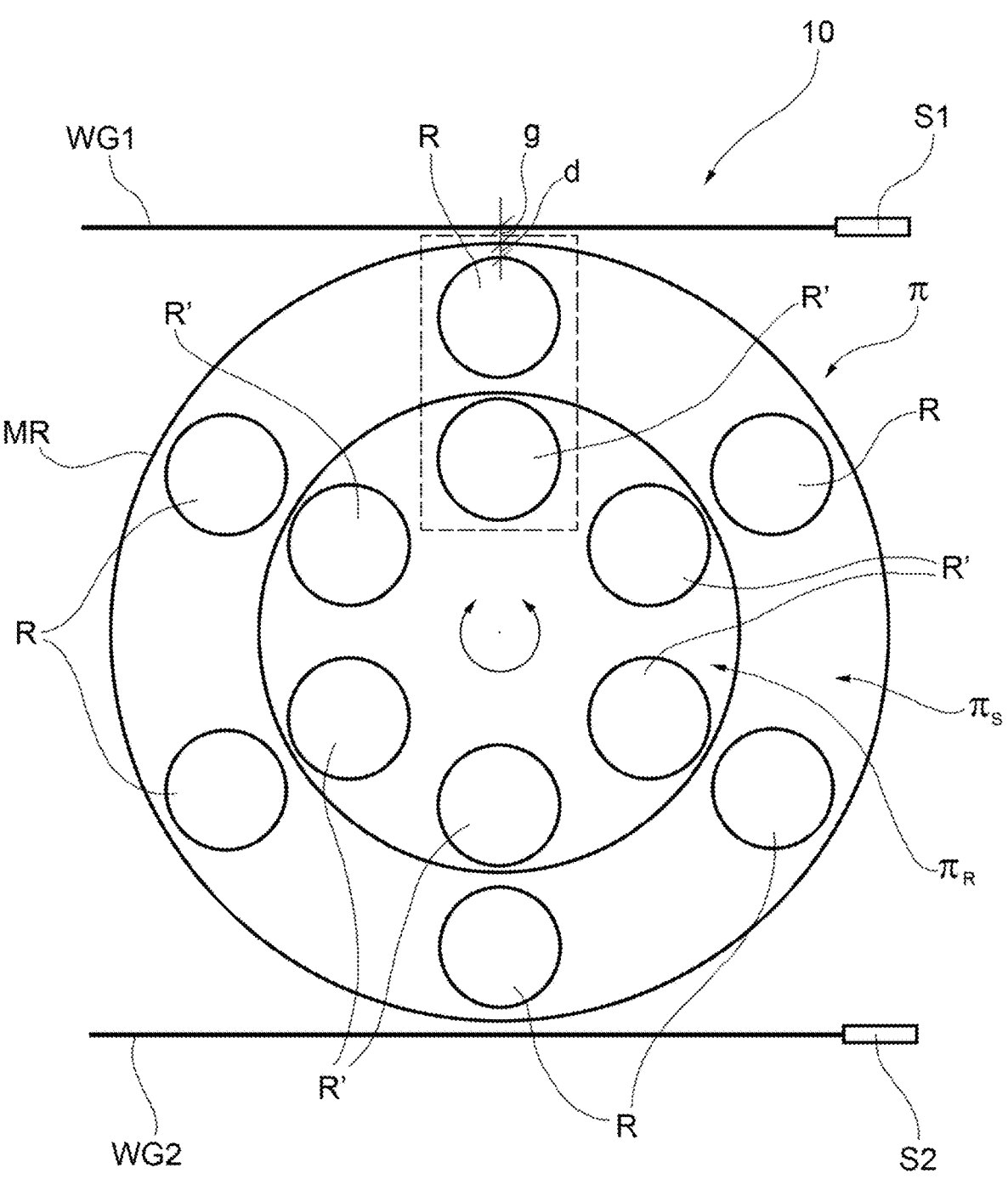
FIG. 9 is a schematic perspective view of a first embodiment of the planar photonic resonant motor according to the invention.
Figure 10:
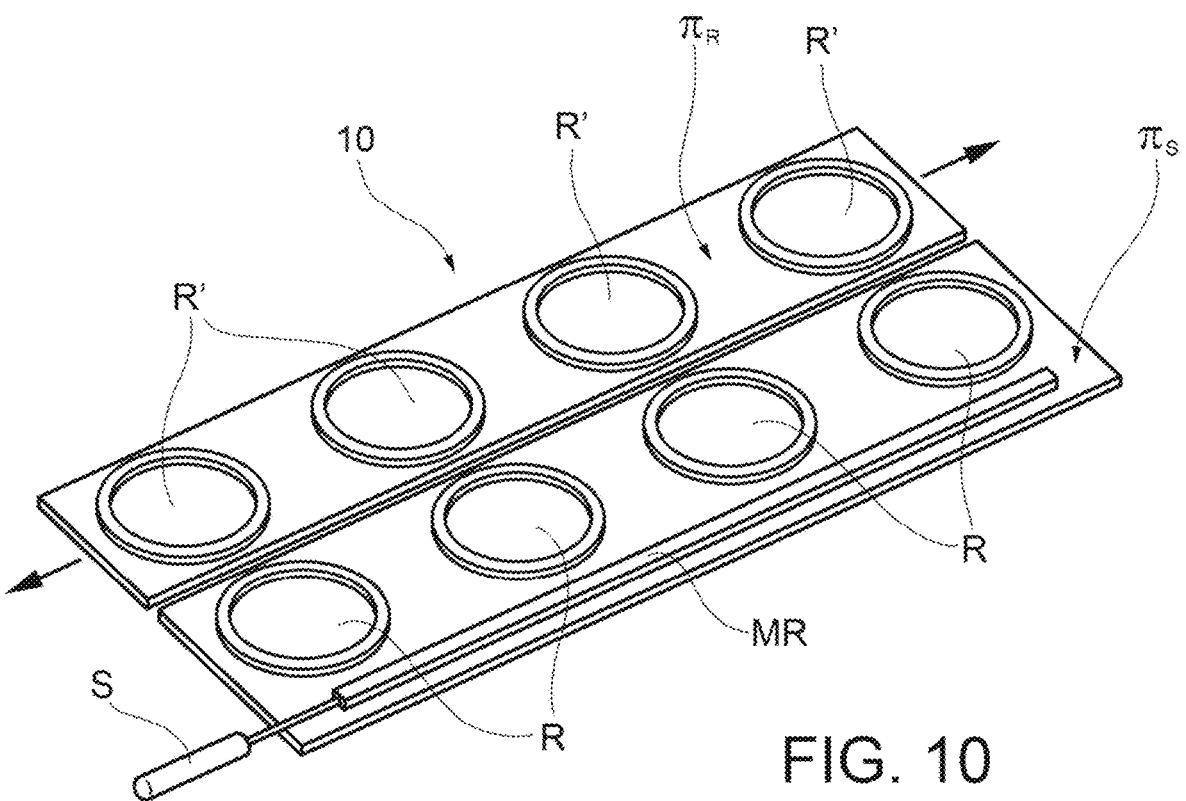
FIG. 10 is a schematic perspective view of a second embodiment of the planar photonic resonant motor according to the invention.

With reference to FIGS. 9 and 10, it is shown how a pair of coplanar arrangements of resonant optical waveguides (photonic resonators), respectively a first arrangement of stator waveguides and a second arrangement of rotor waveguides, distributed in two coplanar and optically coupled regions of space, move reciprocally due to the effect of the asymmetric optical forces that are generated, induced by resonance phenomena similar to those described with reference to the prior art. A person skilled in the art will understand that the optical and opto-mechanical modeling of the photonic resonant motor described above with reference to prior art configurations will also apply to planar photonic resonant motor configurations with the appropriate adaptations.

The opto-mechanical system of the photonic resonant motor M that is the subject of the present invention comprises two coplanar regions of space, i.e., defined in a common plane $\Pi$, lying in close proximity: a rotor region $\Pi_R$, free to rotate, and a fixed stator region $\Pi$s, depicted in FIGS. 9 and 10.

The photonic motor M comprises:

at least one optical radiation input S (in the embodiment shown in FIG. 9, two sources, S1 and S2, are provided);

a first optical waveguide arrangement, including at least one and preferably a plurality of first optical resonators R and a master ring resonator MR arranged in the stator region $\Pi$s of the common plane to form a static part of the aforesaid motor in a predetermined coordinate reference system x, y, z of the motor;

an excitation optical waveguide arrangement, that preferably comprises at least one excitation optical bus waveguide (excitation wave guide) (in the embodiment shown in FIG. 9 two optical bus waveguides WG1 and WG2 are provided), coupled to said first optical waveguide arrangement at a predetermined coupling distance of the optical mode with respect to the master ring resonator MR or more generally to at least one first optical resonator, and configured to receive at least one optical radiation of a predetermined wavelength from the optical radiation input and to optically couple the aforesaid optical radiation to said at least one first optical resonator;

at least one second optical waveguide arrangement including at least one or preferably a plurality of second optical resonators R' arranged in the rotor region $\Pi$R of the common plane, concentric or parallel to the stator region at a predetermined lateral coupling distance.

The second optical waveguide arrangement is configured to move in the rotor region of space with respect to the first optical waveguide arrangement according to at least a predefined direction of movement so as to form a movable part of the motor M in the predetermined coordinate reference system x, y, z of the motor.

In the exemplary embodiment of the invention depicted in FIG. 9, the stator region of space $\Pi_S$ contains a number of optical ring resonators R arranged in a circular geometry and excited simultaneously through the surrounding master ring resonator MR. The concentrically inner rotor region of space $\Pi_R$ contains an equal number of congruent optical ring resonators R' arranged in the same way as the stator region of space $\Pi_S$. Solely by way of example, the resonator pairs R and R', which are formed are all radially aligned, a radial misalignment of some pairs, at a mutual position of the regions of space of the stator and rotor, wherein other pairs are radially aligned, are possible to determine an imbalance of forces. The rotor and stator coplanar regions of space are optically coupled through an evanescent coupling between ring resonators in proximity. The proximity condition varies from 100 nm to about 1500 nm and depends on the radius of the rings, the larger the radius, the smaller the evanescent coupling distance. In addition, there is the possibility of applying a deflection angle with respect to a radial alignment of the resonators, which may vary from 1 to 10 degrees and serves to unbalance the radial forces from tangential ones.

The entire resonant optical cavity is composed of a closed ring of N pairs of laterally coupled ring resonators (LCRR). The master ring is excited through one or two bus waveguides (excitation waveguides), WG1 and WG2, lying in the proximity of the stator region of space. The N pairs of LCRRs interact with each other only through the closed ring formed by a larger ring lying in the stator plane (coinciding with the plane where the outer rings are located. The lateral distance between the stator ring and the master ring MR is denoted with d, while the lateral distance between the master ring MR and the bus waveguide distance (excitation waveguide) WG1 and WG2 is denoted with g. By using the Finite Element Method (FEM), an association between the physical parameters q, d, and g and the fractions of the optical powers that regulate the spectral features of the photonic resonant motor may be found.

According to one variant, the rotor region of space is arranged concentrically outside the stator region of space.

In the exemplary embodiment of the invention depicted in FIG. 10, the stator region of space $\Pi_S$ contains a number of optical ring resonators R arranged in a linear geometry and excited simultaneously through a linear master resonator MR flanking them. The parallel rotor region of space $\Pi_R$ contains—by way of example, but not necessarily—an equal number of optical ring resonators R' arranged in the same way as the stator region of space. The rotor and stator coplanar regions of space are optically coupled through an evanescent coupling between ring resonators in proximity. The proximity condition varies from 100 nm to about 1500 nm and depends on the radius of the rings, the larger the radius, the smaller the evanescent coupling distance.

Figure 11:
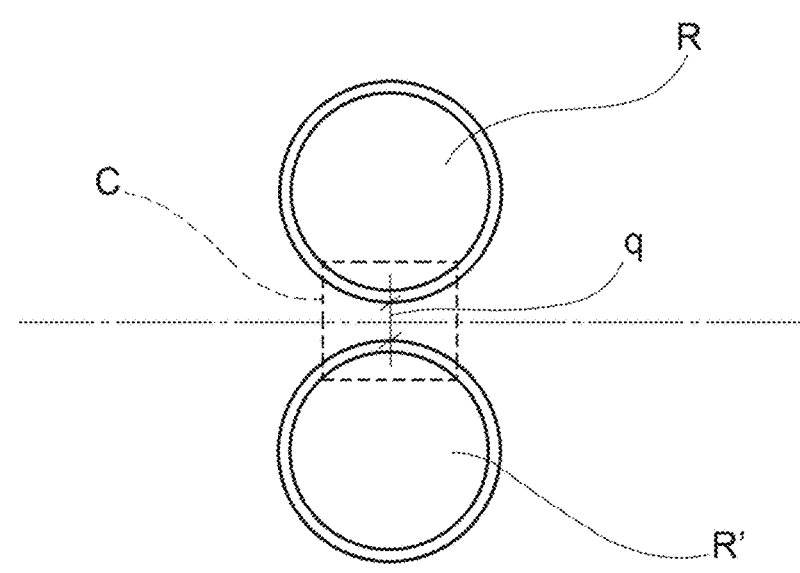
FIG. 11 shows an elementary cell of the photonic resonant motor from FIGS. 9 and 10.

The basic element (elementary cell) of the photonic resonant motor according to an example embodiment of the invention is shown in FIG. 11 and includes two guided wave ring resonators R, R' coupled laterally in an evanescent way in a localized region C, said lateral coupling region, wherein the lateral inter-ring distance is denoted as q. The configuration of the basic element shown is the temporary configuration wherein the mutual position between the two resonators R, R'—which evolves in dependence on the movement of the rotor region with respect to the stator region—is the position of maximum proximity, wherein the centers of the ring resonators are aligned orthogonally to the local direction of movement of the resonator belonging to the rotor region of space.

The photonic motor represented in the figures may be optically modeled by the transfer matrix method, the scattering matrix method, and the coupled mode theory (CMT). By using a lumped parameters model, the opto-mechanical force (radiation pressure), regulating the mechanical behavior of the photonic motor, is derived by the quantum theory.

The force F between two weakly-coupled resonators can be derived from the resonant wavelength shift ($\Delta\lambda$) resulting from a rotation $\theta$ about the axis perpendicular to the plane where the resonators are situated. The force F is given by:

$$F = \frac{1}{2\pi c} \frac{d(\Delta\lambda(\theta))}{d\xi(\theta)} PQ_m$$

where $\zeta$ is the distance between a ring on the stator and a rotor ring, corresponding to an angle of $\theta$. $Q_m$ is the quality factor of a single rotor/stator ring (associated to the m-th order of resonance), while P is the optical power circulating in the resonators.

P is given by $P_i E_N$ where $P_i$ is the input laser power and $E_N$ is the power enhancement factor due to the presence of the master resonator, which allows the recirculation of the photons in the resonators.

The resonant electromagnetic energy stored in a ring resonator of the stator is $PQ\lambda_m/2\pi c$ ($\lambda_m=2\pi r/n_{eff}$, with r the stator/rotor ring radius and $n_{eff}$ the effective refractive index of a stand-alone stator/rotor ring waveguide cross-section). $Q_m$ may be evaluated in a single ring resonator of the stator/rotor, without the perturbation related to the presence of the other rotor/stator ring and calculated at a rotation angle of $\theta=\pi p/N$ (p is an integer and N is the total number of resonator pairs, in the embodiment wherein the number of stator resonators is equal to the number of rotor resonators). The asymmetrical optical forces F associated with the symmetrical and asymmetrical resonant modes, by exciting the resonators of the photonic motor, allow for the generation of a movement of the rotor region of space with respect to the stator region of space and the exploitation of the generated movement by opto-mechanical means.

Naturally, without prejudice to the principle of the invention, the embodiments may vary with respect to that which has been described by way of non-limiting examples, without departing from the scope of protection as defined by the appended claims.

The invention claimed is:

1. A photonic motor comprising:

at least one optical radiation input;

a first optical waveguide arrangement, comprising a plurality of first optical resonators to form a static part of said photonic motor in a predetermined coordinate reference system of the photonic motor;

an excitation optical waveguide arrangement coupled to said first optical waveguide arrangement at a predetermined optical mode coupling distance to at least one first optical resonator of the plurality of first optical resonators and configured to receive at least one optical radiation of predetermined wavelength from said at least one optical radiation input and to optically couple said at least one optical radiation to said at least one first optical resonator of the plurality of first optical resonators;

at least a second optical waveguide arrangement, comprising at least one second optical resonator configured to move with respect to said first optical waveguide arrangement according to at least one predefined direction of movement, so as to form a moving part of said photonic motor in the predetermined coordinate reference system of the photonic motor, wherein said first optical waveguide arrangement and said second optical waveguide arrangement respectively lie in a first region of space and a second region of space of a common plane, mutually separated by a predetermined lateral coupling distance, and the second optical waveguide arrangement is configured to move in said second region of space, wherein said predetermined lateral coupling distance is adapted to establish an evanescent-wave coupling of optical modes between at least one first optical resonator of said first optical waveguide arrangement and the at least one second optical resonator of said second optical waveguide arrangement, in a proximity condition of said first optical resonator and second optical resonator in the common plane as a result of a local motion of said second optical waveguide arrangement in the second region of space, wherein said first optical resonator and second optical resonator are adapted to guide one fundamental resonant symmetric mode at a predetermined first wavelength and one fundamental resonant anti-symmetric mode at a predetermined second wavelength, as a function of said predetermined lateral coupling distance, and of a distance between said first optical resonator and second optical resonator on the common plane, wherein, when the fundamental resonant symmetric mode is selectively established, an attractive condition of said second optical resonator towards said first optical resonator is created, which generates, in said second region of space on said common plane, a motion of approach of the second optical resonator towards the first optical resonator according to a predefined local direction of movement, and, when the fundamental resonant anti-symmetric mode is selectively established, a repulsion condition of said second optical resonator from said first optical resonator is created, which generates in the second region of space on said common plane a motion of departure of the second optical resonator from the first optical resonator according to a predefined local direction of movement, the photonic motor further comprising control means adapted to control at least one parameter of the at least one optical radiation from said at least one optical radiation input so as to selectively establish said fundamental resonant symmetric and anti-symmetric modes, wherein said control means are configured to control synchronously a wavelength of the at least one optical radiation from said at least one optical radiation input so as to switch selectively from the fundamental resonant symmetric mode to the fundamental resonant anti-symmetric mode when said at least one second optical resonator along said predefined local direction of movement in the second region of space of said common plane is near a condition of maximum proximity, or near said predetermined lateral coupling distance with respect to a first optical resonator in the first region of space of said common plane.

2. The photonic motor of claim 1, wherein the at least one parameter of the at least one optical radiation from said at least one optical radiation input is one of: the wavelength, on/off timing, and power of said at least one optical radiation.

3. The photonic motor of claim 1, wherein said first optical waveguide arrangement comprises a plurality of first optical resonators arranged along at least one predetermined path in the first region of space of said common plane, and said second optical waveguide arrangement comprises a plurality of second optical resonators arranged along at least one predetermined path in the second region of space of said common plane.

4. The photonic motor of claim 3, wherein said control means are configured to automatically control at least one parameter of the at least one optical radiation from said at least one optical radiation input so as to selectively establish the fundamental resonant symmetric mode when a position of at least one second optical resonator of the plurality of second optical resonators along said at least one predetermined path in the second region of space of said common plane lags behind a position of a coupled first optical resonator of the first region of space of said common plane according to said predefined local direction of movement, and the fundamental resonant anti-symmetric mode when the position of said at least one second optical resonator along said at least one predetermined path in the second region of space of said common plane is ahead of the position of said coupled first optical resonator of the first region of space of said common plane according to said predefined local direction of movement.

5. The photonic motor of claim 3, wherein said at least one predetermined path in the first region of space of said common plane and said at least one predetermined path in the second region of space of said common plane are closed paths.

6. The photonic motor of claim 5, wherein said closed paths are circular paths.

7. The photonic motor of claim 5, wherein a closed path of second optical resonators in said second optical waveguide arrangement is coaxial to a closed path of first optical resonators in said first optical waveguide arrangement.

8. The photonic motor of claim 3, wherein said at least one predetermined path in the first region of space of said common plane and said at least one predetermined path in the second region of space of said common plane are rectilinear paths.

9. The photonic motor of claim 3, wherein said first and second optical resonators are evenly arranged along said predetermined paths.

10. The photonic motor of claim 1, wherein said first and second optical resonators are ring resonators.

11. The photonic motor of claim 10, wherein said first optical resonators comprise a subset of selectively excited ring resonators and at least one excitation master ring resonator.

12. The photonic motor of claim 11, wherein said subset of first ring resonators and said second ring resonators have a same diameter.

13. The photonic motor of claim 1, wherein said first and second optical resonators are whispering-gallery mode optical resonators.

14. The photonic motor of claim 1, wherein said predetermined lateral coupling distance between the first region of space and the second region of space of said common plane is based on at least one of the predetermined first wavelength of the at least one optical radiation from said at least one optical radiation input, materials, and geometrical features of said first and second optical resonators.

15. The photonic motor of claim 1, wherein said excitation optical waveguide arrangement comprises at least one excitation optical waveguide coplanar with said first optical waveguide arrangement.

16. The photonic motor of claim 15, wherein said first optical waveguide arrangement comprises a plurality of first optical resonators arranged along at least one predetermined circular path in the first region of space of said common plane and said at least one excitation optical waveguide extends along a path at least partially lateral to said at least one predetermined circular path.

17. The photonic motor of claim 15, wherein said first optical waveguide arrangement comprises a plurality of first optical resonators arranged along a predetermined rectilinear path in the first region of space of said common plane, and said at least one excitation optical waveguide extends along a path lateral to said predetermined rectilinear path.

18. The photonic motor of claim 1, wherein said at least one optical radiation input is at least one coherent radiation source or is coupled to at least one coherent radiation source.

19. The photonic motor of claim 18, wherein said at least one coherent radiation source is a laser source, and wherein an operating bandwidth of the laser source is dependent on at least size and materials of said first and second optical resonators and on a dielectric between said first and second optical waveguide arrangements.

20. The photonic motor of claim 1, wherein each of said first and second optical resonators and said excitation optical waveguide arrangement are made as optical fibers, integrated optical guides on a dielectric substrate, active or passive semiconductor structures, plasmonic structures, or polymeric structures.

21. The photonic motor of claim 1, wherein the first optical waveguide arrangement is formed on a substrate of a static part adapted to be mechanically coupled to a first fixed machine structure at rest and the second optical waveguide arrangement is formed on a substrate of a moving part adapted to be mechanically coupled to a second machine structure movable with respect to said first fixed machine structure.

22. A photonic motor assembly, comprising a plurality of elementary units each comprising a photonic motor according to claim 1, said elementary units being mechanically coupled on a plane.

23. A photonic motor assembly, comprising a plurality of elementary units each comprising a photonic motor according to claim 1, said elementary units being mechanically coupled in a three-dimensional volume.

24. The photonic motor of claim 1, wherein said first and second optical resonators are circular ring resonators.

* * * * *